(12) United States Patent
Kumagai et al.

(10) Patent No.: US 9,121,698 B2
(45) Date of Patent: Sep. 1, 2015

(54) ELECTRONIC LEVEL DEVICE AND LEVEL STAFF USED FOR ELECTRONIC LEVEL DEVICE

(75) Inventors: Kaoru Kumagai, Toyko (JP); Minoru Chiba, Tokyo (JP); Jun Abe, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 296 days.

(21) Appl. No.: 13/348,538

(22) Filed: Jan. 11, 2012

(65) Prior Publication Data

US 2012/0182418 A1 Jul. 19, 2012

(30) Foreign Application Priority Data

Jan. 13, 2011 (JP) .................................. 2011-004492

(51) Int. Cl.
*G01C 5/00* (2006.01)
*G01C 9/00* (2006.01)
*G01C 15/06* (2006.01)

(52) U.S. Cl.
CPC .. *G01C 5/00* (2013.01); *G01C 9/00* (2013.01); *G01C 15/06* (2013.01)

(58) Field of Classification Search
CPC ............. G06K 9/00; G06K 9/36; G01C 3/08; G01C 15/06; G01C 5/00; H04N 7/18
See application file for complete search history.

(56) References Cited

U.S. PATENT DOCUMENTS

| | | | | | |
|---|---|---|---|---|---|
| 1,381,023 | A | * | 6/1921 | Schwier | 33/293 |
| 2,058,998 | A | * | 10/1936 | Koulichkov | 33/296 |
| 4,146,969 | A | * | 4/1979 | Chaires | 33/295 |
| 5,537,201 | A | * | 7/1996 | Kumagai et al. | 356/4.08 |
| 6,167,629 | B1 | * | 1/2001 | Chiba | 33/293 |
| 2002/0028016 | A1 | * | 3/2002 | Gotoh | 382/181 |
| 2007/0289152 | A1 | * | 12/2007 | Zeng et al. | 33/293 |
| 2010/0134617 | A1 | * | 6/2010 | Guertler | 348/135 |

FOREIGN PATENT DOCUMENTS

| | | |
|---|---|---|
| JP | H06-241790 A | 9/1994 |
| JP | 07-229737 A | 8/1995 |
| JP | 11-030517 A | 2/1999 |
| JP | 2002-039750 A | 2/2002 |
| JP | 3795190 B2 | 7/2006 |
| JP | 2007-155689 A | 6/2007 |

OTHER PUBLICATIONS

Boeing 2002/08/4 http://www.boeingconsult.com/tafe/ss&so/survey1/level/notes-sur1.htm Fig. 1 and Table 2.*

(Continued)

*Primary Examiner* — Tung Vo
*Assistant Examiner* — Joseph Becker
(74) *Attorney, Agent, or Firm* — Studebaker & Brackett PC (57) ABSTRACT

An electronic level includes a wide-angle lens system having a two-dimensional imaging element configured to form thereon a picture image including an image of a level staff assigned with a code pattern, an extraction part configured to extract the image of the level staff from the picture image, a height-level measurement value calculation part configured to obtain a height-level measurement value indicated by a portion of the code pattern in the image of the level staff extracted by the extraction part, the portion of the code pattern located at a collimation optical axis of the wide-angle lens system, and a calculation part configured to calculate a collimation height from the height-level measurement value.

6 Claims, 5 Drawing Sheets

(56) References Cited

OTHER PUBLICATIONS

Boeing, http://www.boeingconsult.com/tafe/ss&so/survey1/level/notes-sur1.htm.*

An Office Action; Notice of Reason for Rejection, issued by the Japanese Patent Office on Aug. 26, 2014, which corresponds to Japanese Patent Application No. 2011-004492 and is related to U.S. Appl. No. 13/348,538.

* cited by examiner

ELECTRONIC LEVEL DEVICE AND LEVEL STAFF USED FOR ELECTRONIC LEVEL DEVICE

PRIORITY CLAIM

The present application is based on and claims priority from Japanese Patent Application No. 2011-004492, filed on Jan. 13, 2011, the disclosure of which is hereby incorporated by reference in its entirety.

BACKGROUND

Technical Field

The present invention relates to an electronic level (leveling instrument) capable of simultaneously recognizing multiple level staffs and automatically obtaining collimation heights of the respective level staffs, and relates to the level staffs used for the electronic level.

Conventionally, an electronic level is known which performs collimation with respect to each of level staffs, electronically reads code pattern formed on each level staff, and automatically obtains collimation heights of the level staffs (sec Japanese Patent Application Publication No. Hei 7-229737 and Japanese Patent No. 3795190).

This type of electronic level has advantages of causing less reading errors and thereby reducing the surveying time.

However, in order to obtain the collimation heights, the conventional electronic level is required to perform the collimation and read the code patterns for each of the level staffs one by one. Thus, the conventional electronic level has disadvantages of being incapable of simultaneously recognizing multiple level staffs and obtaining the collimation heights thereof.

SUMMARY

The present invention has been made in view of the circumstances described above, and an object of the present invention is to provide an electronic level capable of simultaneously recognizing multiple level staffs and automatically obtaining collimation heights of the respective level staffs.

To accomplish the above object, an electronic level according to one embodiment of the present invention includes a wide-angle lens system having a two-dimensional imaging element configured to form thereon a picture image including an image of a level staff assigned with a code pattern, an extraction part configured to extract the image of the level staff from the picture image, a height-level measurement value calculation part configured to obtain a height-level measurement value indicated by a portion of the code pattern in the image of the level staff extracted by the extraction part, the portion of the code pattern located at a collimation optical axis of the wide-angle lens system, and a calculation part configured to calculate a collimation height from the height-level measurement value.

An electronic level according to one embodiment of the present invention also includes a wide-angle lens system having a two-dimensional imaging element configured to form thereon a picture image including images respectively of a plurality of level staffs assigned with identifiable code patterns allowing measurement of height levels and respectively indicating height levels different from each other, an extraction part configured to extract the images of the plurality of level staffs from the picture image, a height-level measurement value calculation part configured to obtain a height-level measurement value indicated by a portion of the code pattern in each of the images of the plurality of level staffs extracted by the extraction part, the portion of the code pattern located at a collimation optical axis of the wide-angle lens system, and a collimation height calculation part configured to obtain actual collimation heights of the respective level staffs by obtaining offset values used to obtain the actual collimation heights of the level staffs respectively from the height-level measurement values obtained by the height-level measurement value calculation part, and by subtracting the offset values respectively from the height-level measurement values obtained by the height-level measurement value calculation part.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIGS. 1A to 1C are explanatory drawings showing examples of level staffs used for an electronic level of the present invention.

FIGS. 4A to 4C are explanatory views for explaining an example of a surveying work.

FIGS. 5A to 5D are explanatory views showing examples of extraction of images of the level staffs from the picture image stored in the frame memory.

DETAILED DESCRIPTION OF THE PREFERRED EMBODIMENT

Example (Level Staffs Used for Electronic Level of the Invention)

Figure 1A:
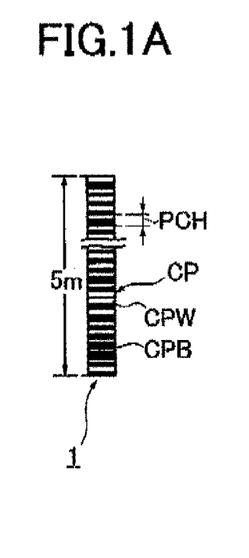
FIG. 1A is an explanatory drawing of a code pattern formed on an existing level staff.
Figure 1B:
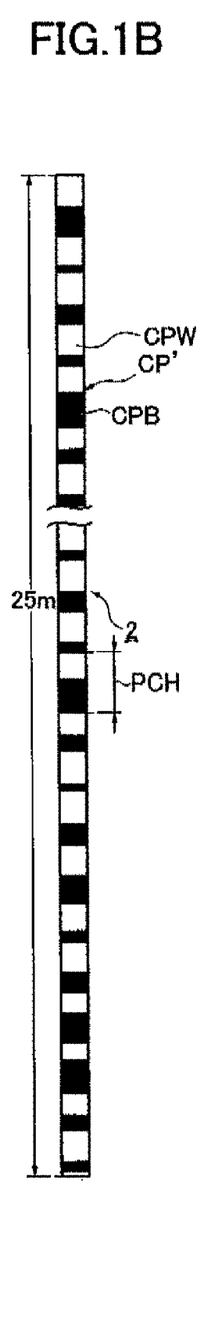
FIG. 1B is an explanatory drawing in which the code pattern formed on the existing level staff is enlarged five times.
Figure 1C:
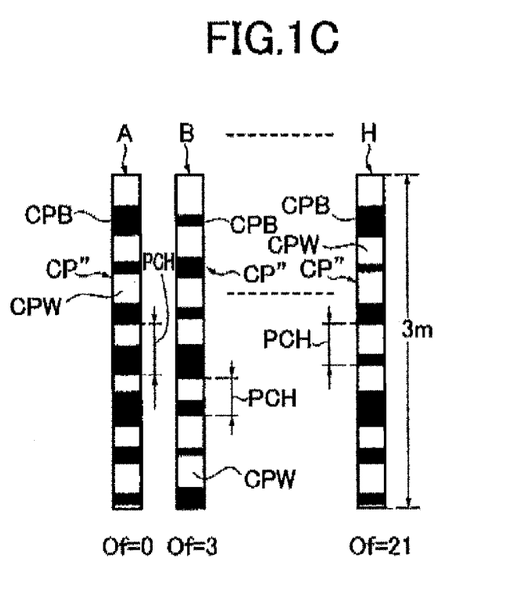
FIG. 1C is an explanatory drawing showing multiple level staffs respectively assigned with multiple code patterns into which the code pattern shown in FIG. 1B is divided.

FIGS. 1A to 1C are explanatory drawings showing examples of level staffs used for an electronic level of the invention. FIG. 1A is an explanatory drawing of a code pattern formed on an existing level staff. FIG. 1B is an explanatory drawing in which the code pattern formed on the existing level staff is enlarged five times. FIG. 1C is an explanatory drawing showing multiple level staffs respectively assigned with multiple code patterns into the code pattern shown in FIG. 1B is divided.

In FIG. 1A, reference numeral 1 denotes the existing level staff. A code pattern CP is formed on the existing level staff I in a height direction. The code pattern CP corresponds to an actual height level of the level staff 1. For example, the code pattern CP allows the height level of the level staff 1 to be determined from the width of each of white portions CPW in the height direction, the width of each of black portions CPB in the height direction, and the pitch PCH of each pair of the white portion CPW and the black portion CPB.

For example, assuming that the length of the level staff 1 is 5 m, portions of the code pattern CP respectively correspond to height levels from 0 m to 5 m.

A level staff 2 shown in FIG. 1B can be obtained by forming the exiting level staff 1 with a size enlarged five times. The overall length of the level staff 2 is 25 m, and a code pattern CP' on the level staff 2 is formed by enlarging the code pattern CP shown in FIG. 1A five times.

The width of each white portion CPW in the height direction, the width of each black portion CPB in the height direction, and the pitch PCH of each pair of the white portion CPW and the black portion CPB in the code pattern CP' are enlarged five times of the width of each white portion CPW in the height direction, the width of each black portion CPB in the height direction, and the pitch PCH in the code pattern CP shown in FIG. 1A.

A code pattern portion of the code pattern CP' corresponds to the actual height level of the level staff 2 having an overall length of 25 m. The level staffs obtained by dividing the level staff 2 are shown in FIG. 1C. In FIG. 1C, the level staff shown in FIG. 1B is divided every three meters.

Eight level staffs receptively denoted by reference signs A to H and each having an overall length of three meters are formed by dividing the level staff 2 shown in FIG. 1B every three meters.

The code patterns CP'' formed respectively on the level staffs A to H indicate the height level of the code pattern CP' shown in FIG. 1B. Thus, the code patterns CP'' indicating the height levels different from actual collimation heights RH of the level staffs A to H are assigned respectively to the level staffs A to H.

(Descriptions of Offset Value)

The code patterns CP'' respectively assigned to the level staffs A to H indicate the height level of the code pattern CP' shown in FIG. 1B, and thus do not indicate the actual collimation heights RH of the respective level staffs A to H. In this sense, height-level measurement values RH' obtained from the code patterns CP'' assigned to the level staffs A to H are offset respectively from the actual collimation heights RH of the level staffs A to H.

Accordingly, in order to obtain the actual collimation heights RH of the level respective staffs A to H from the height-level measurement values RH' of the code patterns CP'' which are obtained respectively for the level staffs A to H, offset values Of need to be subtracted respectively from the height-level measurement values RH' of the level staffs A to H.

For example, the offset value Of for the level staff A is "0", the offset value Of for the level staff A is "3", the offset value Of for the level staff C is "6", the offset value Of for the level staff D is "9", the offset value Of for the level staff E is "12", the offset value Of for the level staff F is "15", the offset value Of for the level staff G is "18", and the offset value Of for the level staff H is "21". These offset values Of can be determined using the height-level measurement value RH' of the code patterns CP'' which are obtained respectively for the level staffs A to H.

As described above, the code pattern CP' corresponding to the actual height level of the single level staff 2 is divided into multiple pieces for the level staffs A to H, and the code patterns CP'' indicating the height levels different from the actual height levels are assigned respectively to the level staffs A to H. Thus, the level staffs A to H can be identified from each other, and also the actual collimation heights RH of the respective level staffs A to H can be each obtained by subtracting the corresponding one of the offset values Of from the height-level measurement value obtained from a portion of a corresponding one of the code patterns CP'' indicating the height levels different from the actual height levels of the level staffs A to H.

(Description of Electronic Level)

Figure 2:
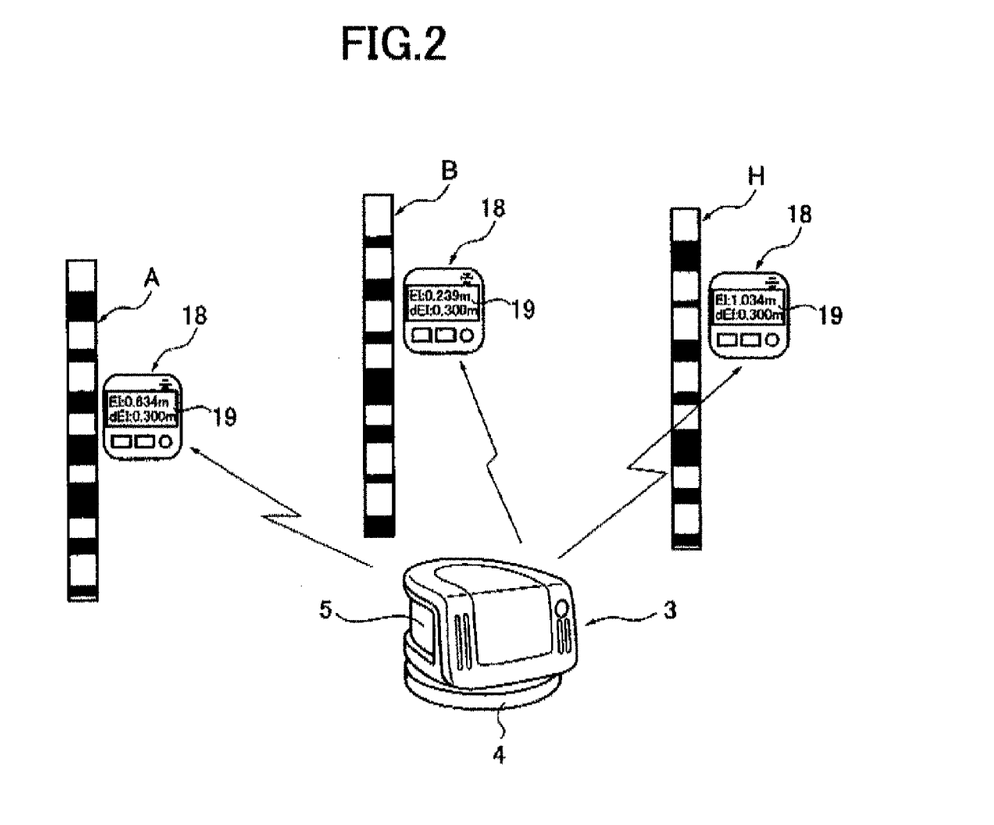
FIG. 2 is a perspective view showing a schematic configuration of the electronic level.

FIG. 2 is a perspective view showing a schematic configuration of an electronic level. In FIG. 2, reference numeral 3 denotes the electronic level. The electronic level 3 is roughly formed of a leveling device 4 and an electronic level main body 5.

Figure 3:
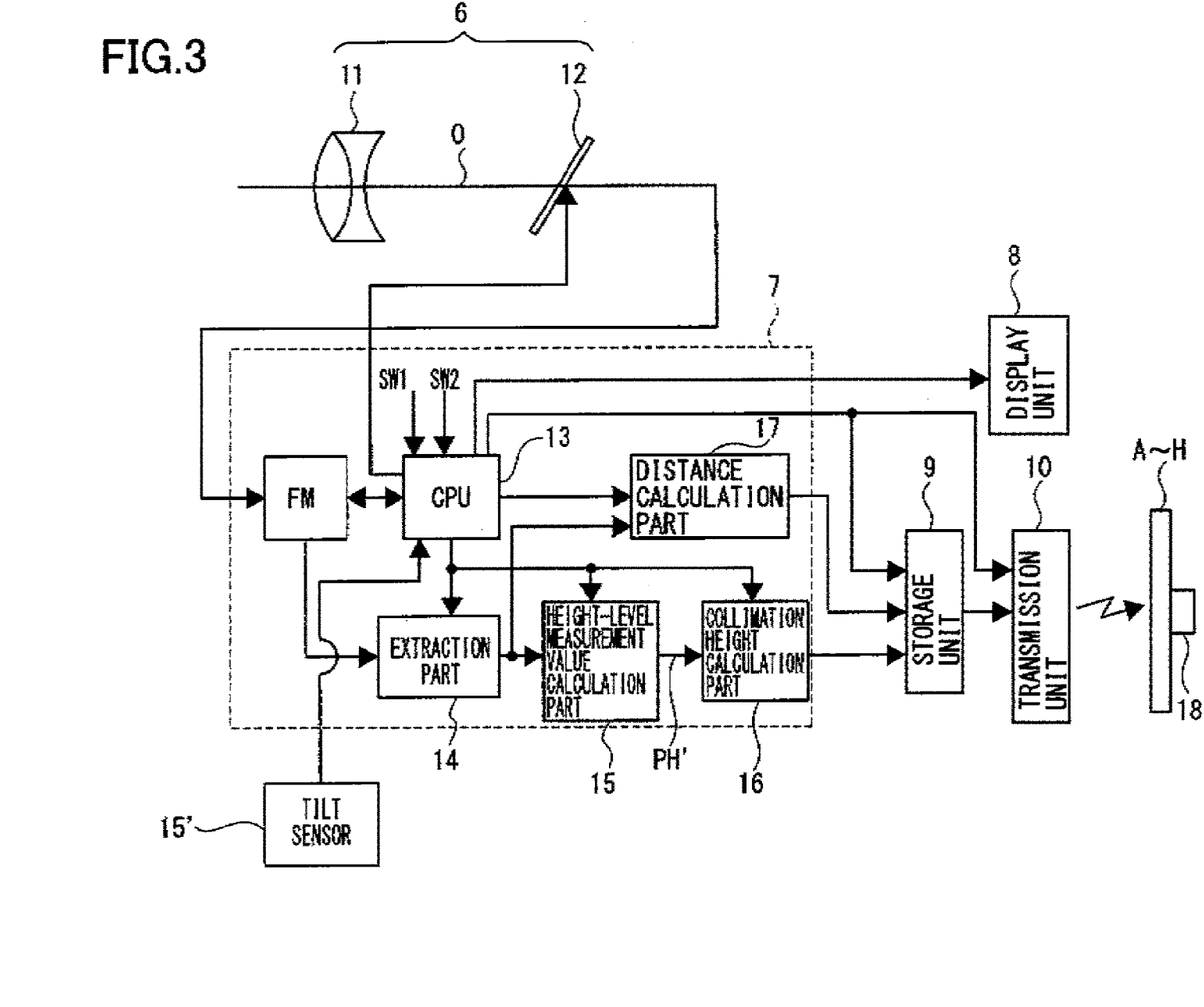
FIG. 3 is a block diagram showing an internal configuration of an electronic level main body.

As shown in FIG. 3, the electronic level main body 5 is provided with a wide-angle lens system 6, a picture image processing unit 7, a display unit 8, a storage unit 9, a transmission unit 10, and a tilt sensor 15', Note that, the display unit 8 is used to display a captured picture image, and the display unit 8 may be omitted.

The wide-angle lens system 6 is roughly formed of an objective lens portion 11 and a two-dimensional imaging element 12 such as a CCD or a CMOS. The two-dimensional imaging element 12 is provided near the focal point of the wide-angle lens system 6. The two-dimensional imaging element 12 is inclined to the vertical direction from the collimation optical axis O. A subject picture image is imaged on the two-dimensional imaging element 12 in a reduced manner, and the focal depth of the wide-angle lens system 6 is almost infinitely large.

The picture image processing unit 7 includes a frame memory FM, a CPU 13, an extraction part 14, a height-level measurement value calculation part 15, a collimation height calculation part 16, and a distance calculation part 17.

The CPU 13 has a function of controlling the display unit 8, the storage unit 9, the transmission unit 10, the two-dimensional imaging element 12, the frame memory FM, the extraction part 14, the height-level measurement value calculation part 15, the collimation height calculation part 16, and the distance calculation part 17.

Moreover, the CPU 13 has a function of setting a reference position LH (see FIG. 4C) in the picture image by using a tilt signal from the tilt sensor 15'.

Specifically, when the electronic level main body 5 is horizontally leveled by the leveling device 4, the collimation optical axis O is maintained horizontal and the collimation optical axis O is set at the reference position at a picture image center O'.

When an imaging switch SW1 is turned on, pieces of pixel data accumulated in the two-dimensional imaging element 12 are sequentially read and outputted to the frame memory FM. The picture images are thus stored in the frame memory FM.

Next, the CPU 13 reads the pixel data stored in the frame memory FM and outputs the pixel data to the extraction part 14.

The extraction part 14 has a function of extracting images of the respective multiple level, staffs from the picture image stored in the frame memory FM.

The height-level measurement value calculation part 15 has a function of obtaining the height-level measurement value RH' indicated by a portion (portion corresponding to the reference position LH (see FIG. 4C)) of the code pattern CP'' in each of the images of the multiple level staffs extracted by the extraction part 14 the portion of the code pattern CP'' located at the collimation optical axis O of the wide-angle lens system 6.

The collimation height calculation part 16 has a function of obtaining the actual collimation heights RH of the respective level staffs by obtaining the offset values Of used to obtain the actual collimation heights RH of the level staffs A to H respectively from the height-level measurement values RH' obtained by the height-level measurement value calculation part 15, and by subtracting the offset values Of respectively from the height-level measurement values RH' obtained by the height-level measurement value calculation part 15.

The distance calculation part 17 has a function of obtaining distances LA to LH from the machine center of the electronic level main body 5 respectively to the level staffs A to H in the following way. For each of the level staffs A to H, the distance calculation part 17 obtains a level staff length l between an upper stadia line provided above the collimation optical axis O and a lower stadia line provided below the collimation optical axis O from the difference between an upper height-level measurement value obtained from a code pattern portion corresponding to the upper stadia line and a lower height-level measurement value obtained from a code pattern portion corresponding to the lower stadia line, and then multiplies the obtained level staff length l by a stadia multiplier α.

Distance ($LA$ to $LH$)=stadia multiplier (α)×level staff length ($l$)

The storage unit 9 has a function of storing pieces of data on the actual collimation heights RH obtained respectively for the level staffs A to H, and also of storing pieces of data on the distances (LA to LH) obtained respectively for the level staffs A to H.

The transmission unit 10 has a function of transmitting the data on the collimation heights RH and the data on the distances (LA to LH) stored in the storage unit 9 to reception devices 18 provided respectively in the level staffs A to H, on the basis of the control of the CPU 13, when a transmission switch SW2 is turned on.

As shown in FIG. 2, each of the reception devices 18 has a display unit 19 configured to display corresponding ones of collimation heights RH and distances (LA to LH). The transmission unit 10 transmits the data on the collimation height RH and the data on the distance (LA to LH) to the reception devices 18 by using publicly known radio communication means. Then, the reception device 18 of each of the level staffs A to H displays one of the collimation heights RH and one of the distances LA to LH which correspond to the level staff.

(Example of Surveying Work)

Figure 4A:
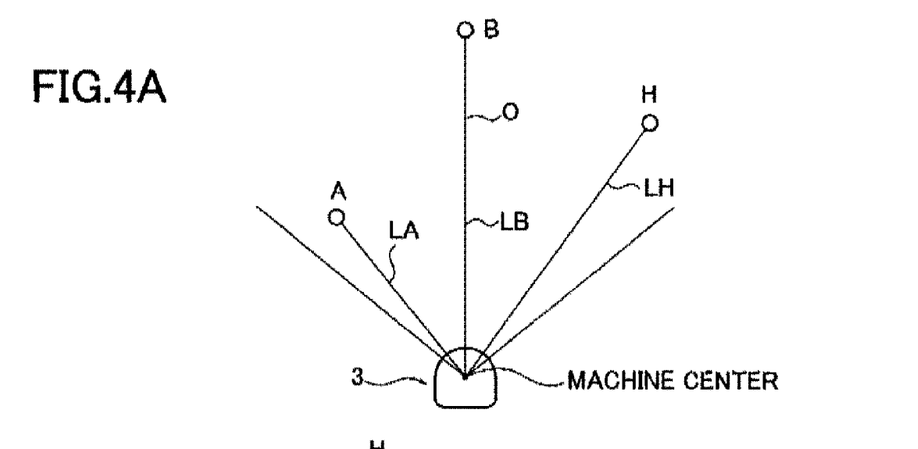
FIG. 4A is a plan view.
Figure 4B:
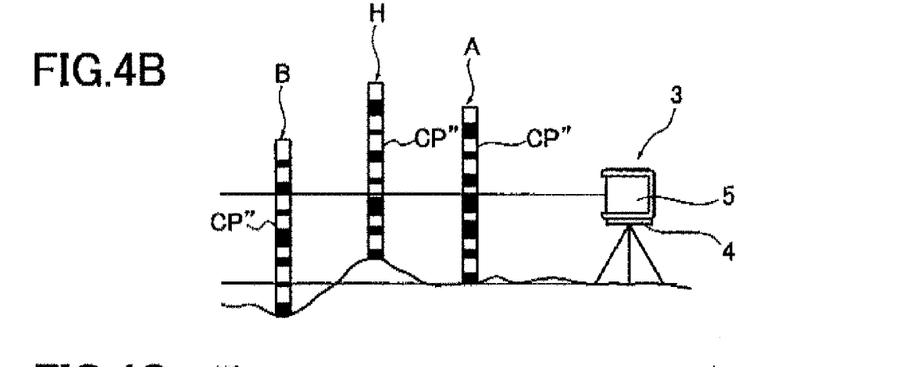
FIG. 4B is a side view.
Figure 4C:
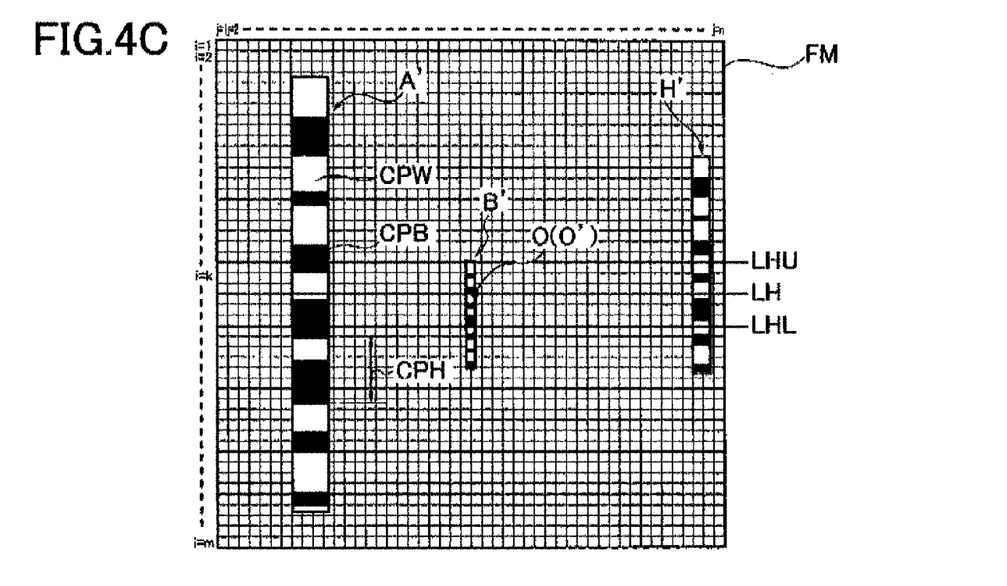
FIG. 4C is a schematic view visually showing a picture image stored in a frame memory.

FIGS. 4A to 4C are explanatory views for explaining an example of a surveying work. FIG. 4A is a plan view, FIG. 4B is a side view, and FIG. 4C is a schematic view visually showing a captured picture image stored in the frame memory FM.

In this example, as shown in FIG. 4A, descriptions are given of the case where the collimation heights RH of the respective three level staffs A, B, and H are to be obtained. It is assumed that the level staff A is set up at a measurement point in a close distance from the electronic level 3, the level staff B is set up at a measurement point in a far distance from the electronic level 3, and the level staff H is set up at a measurement point in a intermediate distance from the electronic level 3.

Moreover, as shown in FIG. 4B, it is assumed that the height level of a ground surface where the level staff B at the measurement point in the far distance is set up is lower than the height level of a ground surface where the level staff A at the measurement point in the close distance is set up. It is also assumed that the height level of a ground surface where the level staff H at the measurement point in the intermediate distance is set up is higher than the height level of the ground surface where the level staff A at the measurement point in the close distance is set up.

When the level staffs A, B, and H having a positional relationship as shown in FIGS. 4A and 4B are simultaneously imaged, a picture image schematically shown in FIG. 4C is obtained.

In FIG. 4C, reference sign A' denotes an image corresponding to the level staff A, reference sign B' denotes an image corresponding to the level staff B, and reference sign H' denotes an image corresponding to the level staff H.

As shown in FIG. 4C, the image A' is displayed in a large size in the picture image since the level staff A exists in the close distance, the image B' is displayed in a small size in the picture image since the level staff B exists in the far distance, and the image H' is displayed in an intermediate size between the size of the image A' and the size of the image B' in the picture image since the level staff H is at the intermediate position between the close distance and the far distance.

Each of the image A', image B', and image H' is an image including the code pattern CP'', and is thus a pattern image of a black and white pattern.

Although images of objects other than the level staffs A, B, and H are displayed in the picture image shown in FIG. 4C, these images are omitted from the picture image for the convenience of explanation.

The extraction part 14 reads pieces of pixel data Gi from i=1st to i=m-th for each of rows j of pixels (Gij), and determines whether the pieces of pixel data Gi includes a code pattern signal CPS in which white levels and black levels are repeated.

Figure 5A:
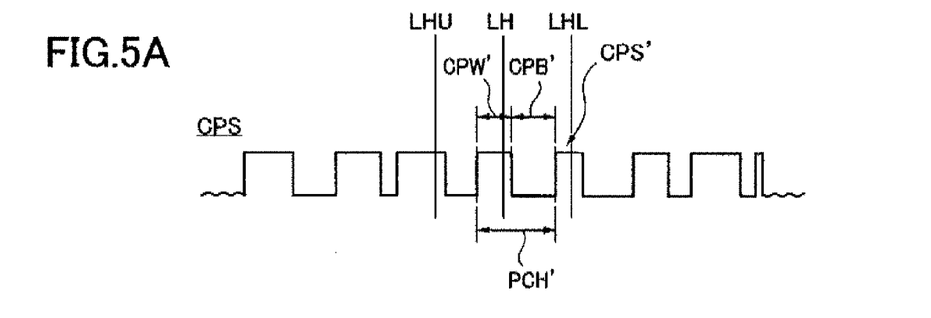
FIG. 5A shows an example of a code pattern signal corresponding to a code pattern of a level staff A.
Figure 5B:
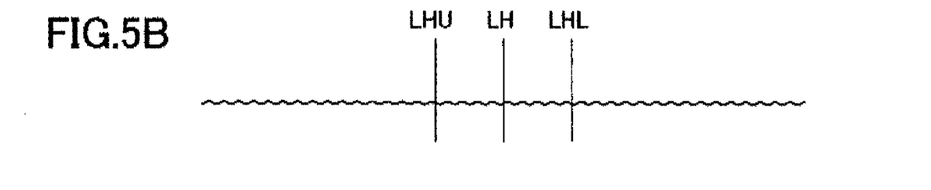
FIG. 5B shows an example of a signal when there are no level staffs A, B, and H.

If the row j includes an image corresponding to the code pattern CP'', the code pattern signal CPS shown in FIG. 5A is obtained, for example. If the row J includes no image corresponding to the code pattern CP'', no code pattern signal CPS is obtained as shown in FIG. 5B.

The extraction part 14 repeats this process for each of the rows j of the pixels (Gij) from j=1st to j=n-th.

FIG. 5A shows, for example, the code pattern signal CPS of j=2. The level staff A is at the position in the close distance from the electronic level 3, and the lateral width of the image A' thereof is thereby large. Thus, similar code pattern signals CPS are repeatedly obtained for several rows of j=3, j=4, and the like among the rows j of the pixels (Gij).

On the other hand, for example, the level staff B is at the position in the far distance from the electronic level 3, and the lateral width of the image B' thereof is thereby small. Thus, similar code pattern signals CPS are repeatedly obtained for only a few times in the rows j of the pixels (Gij).

Figure 5C:
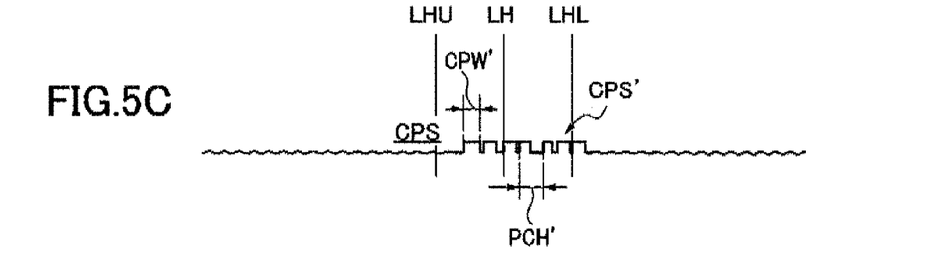
FIG. 5C shows an example of the code pattern signal corresponding to the code pattern of the level staff B.
Figure 5D:
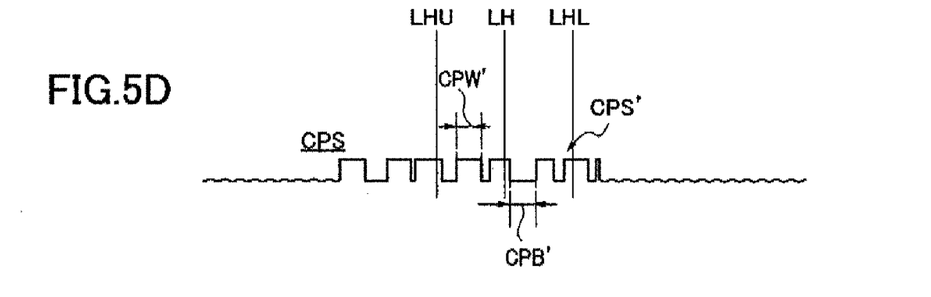
FIG. 5D shows an example of the code pattern signal corresponding to the code pattern of the level staff H.

Moreover, since the level staff B is in the far distance, the code pattern signal CPS corresponding to the image B' of the level staff B has a smaller pitch of each pair of a white level and a black level, as shown in FIG. 5C. Note that, FIG. 5D shows the code pattern signal CPS corresponding to the code pattern CP'' of the image H'.

The process of reading the pieces of pixel data Gi from i=1st to i=m-th is repeated for each of rows j of the pixels (Gij) from j=1 to j=n, and thus the image A', the image B', and the image H' are extracted.

After extracting the image A', the image B', and the image H', the extraction part 14 outputs the code pattern signals CPS corresponding to the code patterns CP'' of the image A', the image B', and the image H' to the height-level measurement value calculation part 15 and the distance calculation part 17.

The height-level measurement value calculation part 15 calculates the height-level measurement value RH' of each of the level staffs by using the widths CPB' of the black levels, the widths CPW' of the white levels, and the pitch PCH' of each pair of the white level and the black level in a code pattern signal CPS' corresponding to a portion of the code pattern CP'' which is within a range between an upper stadia equivalent line LHU and a lower stadia equivalent line LHL respectively above and below a horizontal line (reference position) LH including the collimation optical axis (picture image center O') O shown in FIGS. 4A to 4C.

Pieces of data on the height-level measurement values RH' for the respective level staffs are outputted to the collimation height calculation part 16. The collimation height calculation part 16 obtains the offset value Of to be subtracted from each of the height-level measurement values RH'. The collimation height calculation part 16 determines the offset value Of by judging which one of the following ranges the value of the obtained height-level measurement value RH' is included in: a range of "0 to less than 3"; a range of "3 to less than 6"; a range of "6 to less than 9"; a range of "9 to less than 12"; a range of "12 to less than 15", a range of "15 to less than 18"; a range of "18 to less than 21"; and a range of "21 to less than 24".

Moreover, by judging which one of the aforementioned ranges the value of the obtained height-level measurement value RH' is included in, the level staff among the multiple level staffs A to H to which the obtained height-level measurement value RH' corresponds can be identified.

The collimation height calculation part 16 obtains the actual collimation height RH by subtracting the offset value Of from the height-level measurement value RH' obtained by the height-level measurement value calculation part 15.

In other words, RH=RH'−Of.

Pieces of data on the actual collimation heights RH of the level staffs A to H are outputted to the storage unit 9, and are stored respectively in storage regions of the unit 9 for the level staffs A to H.

Here, the pieces of data on the collimation heights RH corresponding to the level staffs A, B, and H are stored respectively in the corresponding storage regions of the storage unit 9.

The distance calculation part 17 obtains the level staff length l between the upper and lower stadia equivalent lines for each of the level staffs from the difference between an upper height-level measurement value RH'' and an lower height-level measurement value RH'', the upper height-level measurement value RH'' obtained from a portion of the code pattern CP'' existing on the stadia equivalent line LHU, the lower height-level measurement value RH'' obtained from a portion of the code pattern CP'' existing on the stadia equivalent line LHL. Then, as described above, the distance calculation part 17 obtains the distance L from the machine center of the electronic level 3 to each of the level staffs A, B, and H.

Pieces of data on the distances L to the level staffs A to H which are obtained by the distance calculation part 17 are sent to the storage unit 9, and are stored respectively in the storage regions of the storage unit 9 for the level staffs A to H.

When the transmission switch SW2 is operated, the CPU 13 causes the data on the collimation heights RH and the data on the distances L which are stored in the storage unit 9 to be outputted to the transmission unit 10, and the transmission unit 10 transmits the data on the collimation heights RH and the of data on the distances L to the reception devices 18 of the level staffs A to H, on the basis of channels allocated respectively to the level staffs A to H.

As described above, in the example, descriptions have been given of the case where the code pattern corresponding to the actual height level of the single level staff is divided into multiple pieces and the code patterns indicating the height levels different from the actual height collimation heights are assigned respectively to the multiple level staffs. However, the invention is not limited to this example.

For example, the present invention may employ a configuration including: a wide-angle lens system having a two-dimensional imaging element configured to form thereon a picture image including images respectively of multiple level staffs assigned with identifiable code patterns allowing the measurement of height level and respectively indicating height levels different from each other; an extraction part configured to extract the images of the multiple level staffs from the picture image; a height-level measurement value calculation part configured to obtain a height-level measurement value indicated by a portion of the code pattern in each of the images of the multiple level staffs extracted by the extraction part, the portion of the code pattern located at a collimation optical axis of the wide-angle lens system; and a collimation height calculation part configured to obtain the actual collimation heights of the respective level staffs by obtaining offset values used to obtain the actual collimation heights of the level staffs respectively from the height-level measurement values obtained by the height-level measurement value calculation part, and by subtracting the offset values respectively from the height-level measurement values obtained by the height-level measurement value calculation part.

Moreover, for example, the present invention may employ a configuration including: a wide-angle lens having a two-dimensional imaging element configured to form thereon a picture image including an image of a level staff assigned with a code pattern; an extraction part configured to extract the image of the level staff from the picture image; a height-level measurement value calculation part configured to obtain a height-level measurement value indicated by a portion of the code pattern in the image of the level staff extracted by the extraction part, the portion of the code pattern located at a position located at a collimation optical axis of the wide-angle lens system; and a calculation part configured to calculate a collimation height from the height-level measurement value.

According to the embodiment of the present invention, the electronic level and the level staff allow the multiple level staffs to be simultaneously recognized and allow the collimation heights of the respective level staffs to be automatically detected.

Moreover, assume that the electronic level includes: the wide-angle lens system having a two-dimensional imaging element configured to form thereon the picture image including images respectively of the multiple level staffs assigned with the code patterns into which a code pattern corresponding to an actual height level of a single level staff is divided, the code patterns respectively indicating height levels different from the actual height level; the extraction part configured to extract the images of the multiple level staffs from the picture image; the height-level measurement value calculation part configured to obtain the height-level measurement value indicated by the portion of the code pattern in each of the images of the multiple level staffs extracted by the extraction part, the portion of the code pattern located at the collimation optical axis of the wide-angle lens system; and the collimation height calculation part configured to obtain actual collimation heights of the respective level staffs by obtaining offset values used to obtain the actual collimation heights of the level staffs respectively from the height-level measurement values obtained by the height-level measurement value calculation part, and by subtracting the offset values respectively from the height-level measurement values obtained by the height-level measurement value calculation part. In this configuration, since the code pattern corresponding to the actual height-level of the single level staff is enlarged and divided into multiple pieces and the divided code patterns are associated to the level staffs, the actual collimation height of the respective levels staff can be obtained by using the offset values and the height-level measurement values obtained from the code patterns associated to the level staffs. Thus, it is advantageous in that the collimation heights of the level staffs within a range from a close distance to a far distance can be automatically and simultaneously measured without having a resolution deteriorated.

In addition, the code pattern corresponding to the actual height-level of the single level staff is divided into multiple code patterns, and the code patterns indicating the height levels different from the actual collimation heights are assigned respectively to the level staffs. Thus, the level staffs can be automatically identified from each other by using the height-level measurement values obtained by reading the code patterns assigned to the level staffs, and there is no need to provide identification marks and the like which are used to identify the level staffs. Hence, this configuration is advantageous in that the manufacturing of the level staff is facilitated.

Furthermore, a code pattern of an existing level staff can be used. Thus, the simultaneous measurement of the level staffs can be performed without drastically changing a program used in arithmetic processing for obtaining the collimation heights.

Disposing the two-dimensional imaging element in a manner inclined to the vertical direction from the collimation optical axis allows the blur amount in a close-distance picture image to be reduced. Thus, this configuration advantageous in that the deterioration in the reading accuracy of the code pattern of the level staff in a close distance can be prevented.

Although the embodiment of the present invention has been described above, the present invention is not limited thereto. It should be appreciated that variations may be made in the embodiments described by persons skilled in the art without departing from the scope of the present invention.

What is claimed is:

1. An electronic level comprising:
    a plurality of level staffs respectively of which are assigned with identifiable code patterns allowing measurement of height levels and respectively indicating height levels different from each other, and respectively of which are provided in positions different from each other;
    a wide-angle lens system having a two-dimensional imaging element configured to form thereon a picture image including images respectively of the plurality of level staffs which are provided in the positions different from each other;
    an extraction part configured to extract the images of the plurality of level staffs from the picture image;
    a height-level measurement value calculation part configured to obtain a height-level measurement value indicated by a portion of the code pattern in each of the images of the plurality of level staffs extracted by the extraction part, the portion of the code pattern located at a collimation optical axis of the wide-angle lens system; and
    a collimation height calculation part configured to obtain actual collimation heights of the respective level staffs by obtaining offset values used to obtain the actual collimation heights of the level staffs respectively from the height-level measurement values obtained by the height-level measurement value calculation part, and by subtracting the offset values respectively from the height-level measurement values obtained by the height-level measurement value calculation part.

2. The electronic level according to claim 1, wherein the two-dimensional imaging element is inclined to a vertical direction from the collimation optical axis of the wide-angle lens system.

3. The electronic level according to claim 1, further comprising a distance calculation part configured to obtain a distance to each of the level staffs by: obtaining a level staff length between an upper stadia line provided above the collimation optical axis and a lower stadia line provide below the collimation optical axis by use of a difference between a upper height-level measurement value obtained from a code pattern portion corresponding to the upper stadia line and a lower height-level measurement value obtained from a code pattern portion corresponding to the lower stadia line; and by multiplying the obtained level staff length by a stadia multiplier.

4. The electronic level according to claim 1, further comprising:
    a storage unit configured to store pieces of data on the actual collimation heights obtained respectively for the level staffs and to store pieces of data on the distances obtained respectively for the level staffs; and
    a transmission unit configured to transmit the data on the collimation height and the data on the distance stored in the storage unit to a reception device provided in each of the level staffs.

5. A level staff used for the electronic level according to claim 1, wherein the level staff is assigned with a code pattern indicating a height-level different from an actual collimation height, the code pattern being one of code patterns into which an enlarged code pattern indicating a height level of a single level staff is divided.

6. The electric level according to claim 1, wherein the level stags are formed by enlarging a single level staff, and dividing the enlarged single level staff to divide a code pattern corresponding to an actual height level of the single level staff into a plurality of code patterns, so that the level staffs are assigned with the code patterns which indicate height levels different from the actual height level.

* * * * *